Patented June 27, 1939

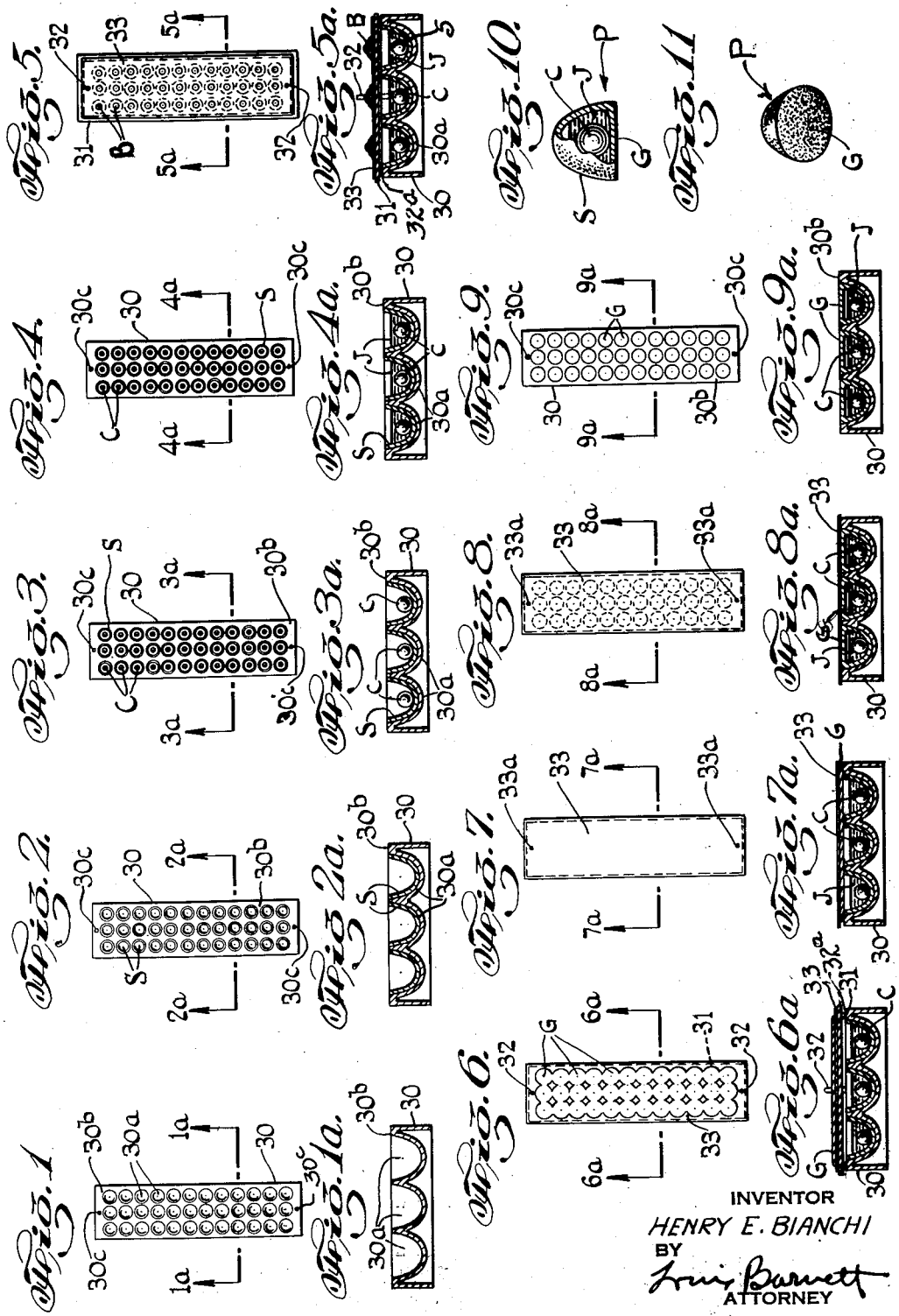

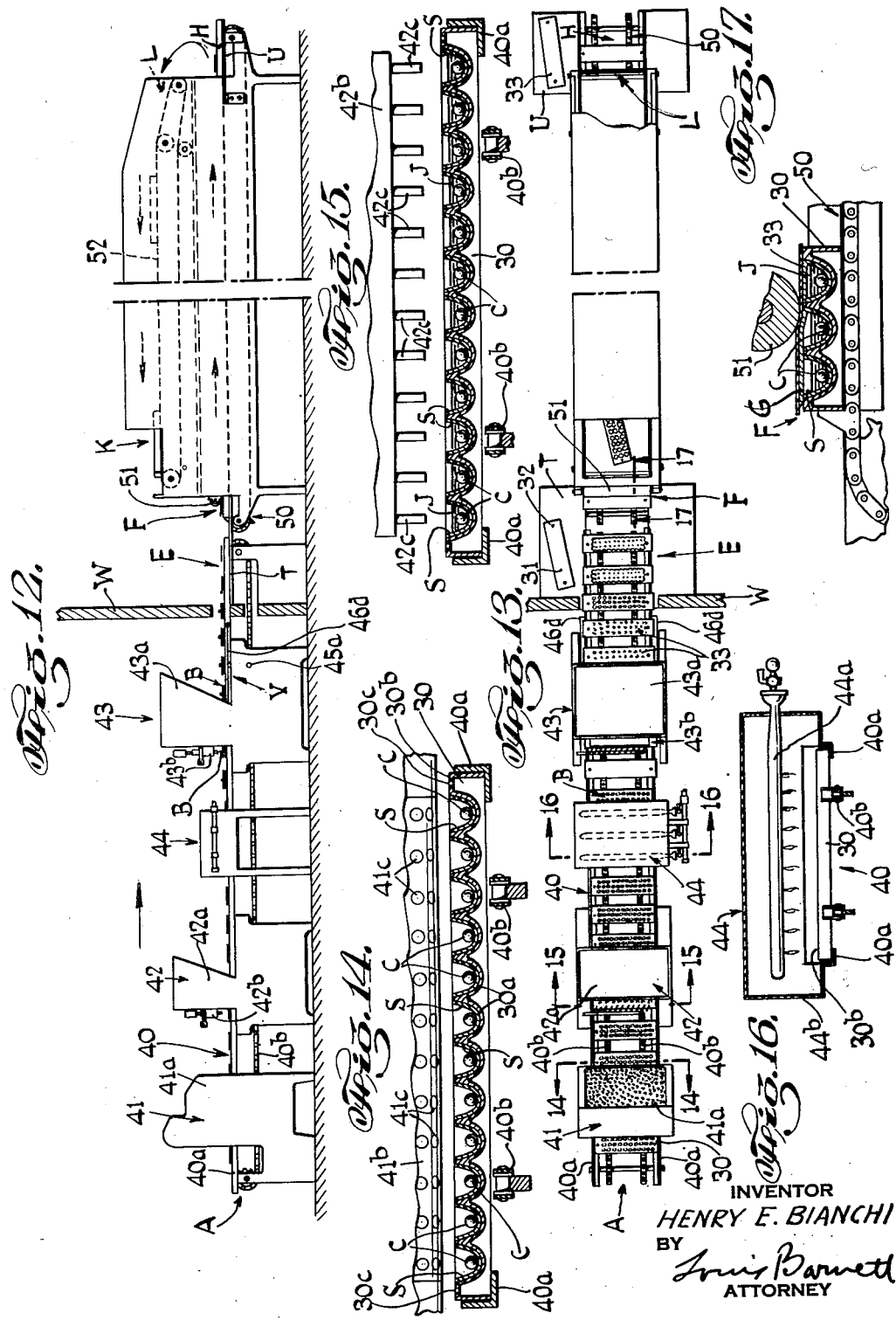

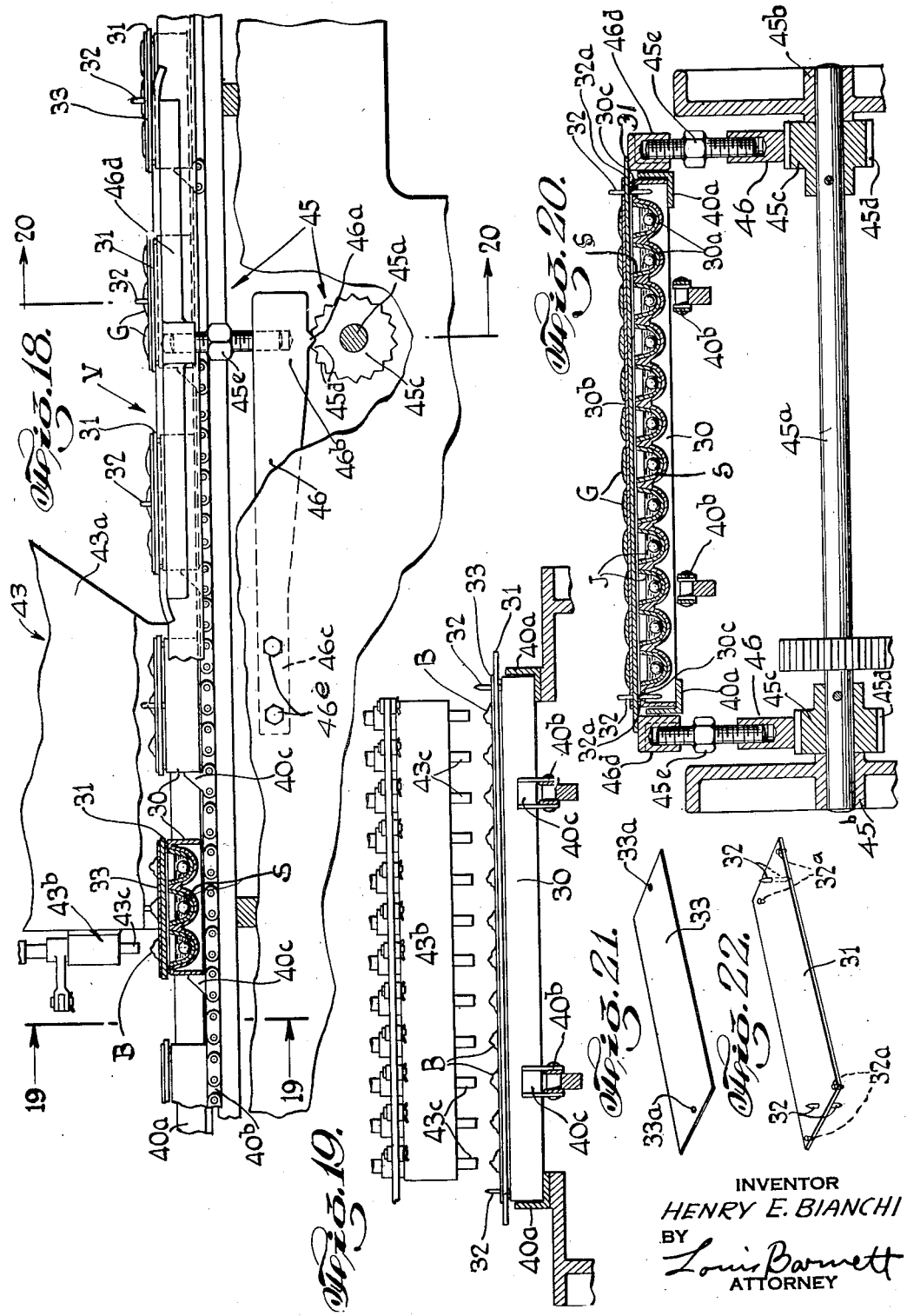

2,163,579

UNITED STATES PATENT OFFICE 2,163,579

MANUFACTURE OF CONFECTIONS

Henry E. Bianchi, Rutherford, N. J., assignor to G. Cella, Inc., a corporation of New York Application November 6, 1936, Serial No. 109,406

6 Claims. (Cl. 107—54)

This invention relates to confections and the manufacture thereof. More particularly the invention is directed to a method for enclosing in chocolate shells liquids or preserve fruits in juices or syrups.

Among the objects of the invention is to generally improve methods of the character described by providing a novel process of manufacture which shall be readily adapted for quantity production and which shall be practical and efficient to a high degree in use.

Other objects of the invention will be obvious and in part hereafter pointed out. The invention accordingly consists of features of production, combination of process steps which will be exemplified in the method hereinafter described and which the scope of the application will be indicated by the following claims.

In the accompanying drawings in which is shown one of the various possible illustrative embodiments of the invention and the novel method of practising the same.

Figs. 1 to 9, inclusive, are plan views showing the progressive steps in practising the improved method embodying the invention for making chocolates filled with syrup or juice and cherries in quantity production.

Figs. 1a to 9a, inclusive, are enlarged cross sectional views taken on lines 1a—1a, 2a—2a, 3a—3a, 4a—4a, 5a—5a, 6a—6a, 7a—7a, 8a—8a and 9a—9a in Figs. 1 to 9, inclusive, respectively.

Fig. 10 is a front elevational view of a finished confection chocolate produced by the improved method embodying the invention, partly broken away to expose the interior.

Fig. 11 is a perspective view of the chocolate confection tipped to show the bottom side thereof.

Figs. 12 and 13 are front elevational and plan views, respectively, of an apparatus arranged to practise the invention in quantity production.

Figs. 14 to 17, inclusive, are enlarged cross-sectional views taken on lines 14—14, 15—15, 16—16 and 17—17, respectively, in Fig. 13.

Fig. 18 is a front elevational view of a fragmentary portion of the improved apparatus showing means for advancing the molds on the conveyor during the step of spreading the bottom chocolate layers.

Figs. 19 and 20 are enlarged cross-sectional views taken on lines 19—19 and 20—20, respectively, in Fig. 18, and Figs. 21 and 22 are perspective views of the interposing sheet and plate for carrying and applying the bottom chocolate layers.

Referring in detail to the drawings there is here provided for practising the invention, a plurality of multi-cavity molds 30 preferably made of metal of a form for example, as shown in Figs. 1 and 1a, each mold being either cast, machined or stamped with thirty-six cells or cavities 30a.

For use in conjunction with each of said molds 30 there is provided a rigid plate 31 which may be slightly larger than the top side 30b of the mold 30. Said plate 31 may be releasably mounted in registered align with the mold by any suitable means, such as spaced dowel pins 32 upstanding from opposite sides of each plate 31 to provide two independent sets of such means, as shown in Fig. 22. Said pins 32 projecting from one side of the plate 31 slideably fit into spaced holes 30c which extend in from the top side 30b of each mold 30, as shown in Fig. 1. Said plate 31 may be selectively reversed with respect to the mold 30 so that either side of the plate 31 faces the mold 30 with a set of spaced pins 32 entered into the holes 30c as shown in Figs. 5, 5a or 20 and as reversed in Figs. 7, 7a.

There is also here provided a relatively thin interposing sheet 33 similar in shape and size as the plate 31. Said sheet 31 may be surfaced of a finished material on which chocolate when deposited thereon is on solidification readily removed without adhering. Spaced openings 33a are provided in said sheet 33 to fit one of the set of pins 32 when said sheet 33 is mounted in position on plate 31, as shown in Figs. 5a, 6a, 19, 20, 21 and 22.

If desired, the plate 31 may be provided with corner feet 32a projecting up from one side thereof for spacing the plate when mounted on the mold in the position shown in Figs. 5a and 6a.

In practising the invention for quantity production the apparatus shown in Figs. 12 to 20, inclusive, may be used. Said apparatus may include a horizontally disposed conveyor 40 having spaced stationary side bars or rails 40a, and spaced sprocket chains 40b movably mounted between said rails 40a. Said chains 40b may be intermittently driven through motor or other suitable power means (not shown) in the well understood manner. Said conveyor 40 may have mounted thereon in spaced relation and cooperatively driven therewith, a fruit feeder 41 for supplying cherries or like pieces of fruit, a syrup or juice supplier 42 and a chocolate depositor 43, an oven heater 44 being provided between the juice supplier 42 and chocolate depositor 43, as shown in Figs. 12 and 13.

The frui. feeder 41 may be of any conventional make and as here shown feeds cherries C from a supply hopper 41a by means of a rotary drum 41b which has cavities 41c in the peripherial surface thereof, said cavities 41b each with a cherry C therein being spaced and brought in register with a chocolate shell S in the consecutive rows of the mold cavities 30a when the molds 30 are brought under the feeder 41 as shown in Fig. 14.

The syrup or juice supplier 42 may be of any well understood construction and as here shown supplies measured quantities of syrup or juice from a reservoir 42a through a valve block 42b having spouts 42c, the latter being spaced to align with the shells S in the mold cavities 30a when the molds 30 are brought under said juice supplier 42, as shown in Fig. 15.

The chocolate depositor 43 may also be of any well known construction to the extent, as here shown, that drops or buds B of chocolate are deposited from a mixer-container 43a through a valve block 43b onto the plate supported sheet 33, said block 43b having nozzles 43c spaced to correspond with the spacing of the shells S in the mold cavities 30a under the plate 31 when the molds 30 are disposed beneath said chocolate depositor 43, as shown in Figs. 18 and 19.

In practising the invention the drops or buds B are made of sufficient chocolate in quantity to provide the formation of bottoms of the finished product, said formation being accomplished through a "forced spreading" by the use of a shaker or vibrating means denoted generally at 45, and shown in Fig. 18, and actuated in cooperation with the chain conveyor 40, the operation of which will hereinafter be more fully described.

The oven heater 44 may be of any standard type and as here shown includes a gas burner 44a enclosed in a casing 44b which extends over a portion of the conveyor 40 so that the molds 30, after being filled but before the chocolate bottoms are applied to the product, have their top side 30b subjected to a heat as is clear from Figs. 12 and 15.

The above described apparatus is operated to carry out the method embodying the invention as follows:

After the cells or cavities 30a of the molds 30 are coated with cup shaped chocolate layers, each of which forms a shell S to provide the sides and top of the confection product P by any well understood process in which each of said cavities 30a of the empty molds 30, shown in Figs. 1, and 1a receives a coating of chocolate to form the shell S as shown in Figs. 2 and 2a, said cavity-chocolate coated molds 30 are placed between the rails 49a of the conveyor 40 at the end thereof marked A, (see Figs. 12 and 13) one at a time. The conveyor chains 40b, moving intermittently in the direction indicated by the arrow shown in Fig. 12, slidably carries the mold 30 under the fruit feeder 41. Upright pushers 40c (see Fig. 18) spaced along the links of the chains 40b engage successive molds 30 carrying the latter along in the movement thereof. The drive of the chains 40b and pushers 40c being intermittent, there is a dwell or rest in the progressive movement arranged to occur when the mold 30 reaches a position under the fruit feeder 41. At that time cherries C drop out of the drum 41b from the supply hopper 41a into the shells S retained in the mold cavities 30a, as shown in Figs. 3a and 14.

The conveyor 40 then continues to advance and when the mold 30 with shells S and cherries C reach a position under the syrup supplier 42 there occurs another dwell or rest and a measured quantity of syrup J from the reservoir 42a is allowed to pass through the valve block 42b and be distributed by spouts 42c to all the shells S concurrently, in the manner shown in Figs. 4a and 15. The quantity of syrup supplied to each shell S is approximately three quarters the contents thereof so that after sealing said shells S the finished product P will be short of being completely filled. See Fig. 10.

The conveyor 40 as it continues to advance the mold 30 with the shells S each filled with a cherry C and syrup J passes through the oven heater 44. The mold 30 and contents are heated to precondition the upper portions of the shells S for the step of sealing same, the heat absorbed by said mold and contents being sufficient to retain such conditioning until the application of the closure bottoms G. This latter operation will be further described hereinafter.

The construction, arrangement and relative locations of the devices comprising the fruit feeder 41, juice supplier 42, chocolate depositor 43 and the oven heater 44 are such that the dwells occur in the line of successive molds with a mold located in alignment with each of said devices. Thus the operations of the fruit feeding, syrup supplying, chocolate depositing and heating occur simultaneously. The application of heat for preconditioning the product in the molds takes place before the depositing of the chocolate and prior to mounting the plate 31 on the mold.

As each mold and preconditioned shells S leave the heater 44, and before they reach the chocolate depositor 43 at the position indicated at B, in Figs. 12 and 13, a plate 31 carrying sheet material 33 facing up is mounted on each mold 30 over the contents, the downwardly extending set of dowel pins 32 being entered into the holes 30c of the mold 30 for positively aligning said plate 31 and sheet material 33 with respect to the mold contents. The conveyor 40 as it continues to advance, and when the heated and filled mold 30 with the plate 31 and sheet material 33 mounted thereon, reaches a position directly under chocolate depositor 43, there occurs another dwell or rest. A measured quantity of fluid chocolate from the mixer-container 43a is then allowed to flow through the valve block 43b and be simultaneously deposited by the nozzles 43c as drops or buds B on the sheet material 33. One bud B is provided for each shell S in exact alignment over the filled shells of the mold 30, as shown in Figs. 5, 5a, 18 and 19. The buds B are conical when deposited and are in a plastic state, each bud B having a circular shape outline on the sheet material 33 of a size that is insufficient to form a complete sealing closure for the shell to serve as the bottom G of the product P.

The invention contemplates in the practise thereof to speedily and positively change said buds B, during the continuous process, to circular shaped wafer-thin bottoms G of sufficient size to provide a complete sealing closure for the shell.

To this end a "forced spreading" operation of the buds B while in plastic state is provided. As here shown this is accomplished through vibration. Referring now to Figs. 18 and 19 the portion of the frame of the conveyor 40 beyond the depositor 43, indicated at V, carries below the rails 40a a shaft 45a journalled at 45b in the conveyor frame.

Said shaft 45a which may be continuously driven by any suitable means (not shown) in the well understood manner, has spaced ratchet wheels 45c mounted to turn therewith. Each wheel 45c is provided with teeth 45d over which a projecting tooth 46a on an end 46b of a bar lever 46 rides. The other end 46c of said lever 46 is pivoted to said conveyor frame 40 by bolts 46e so that on rotation of the wheel teeth 45b, the lever tooth 46a riding thereon, causes said lever end 46b to vibrate. This vibration is transmitted through height adjusting screws 45e upstanding on the lever end 46b to head bars 46d which engage the plate 31 for lifting the same off the filled mold and supporting same as it passes along the conveyor 40 at V without interfering with the advanced movements thereof as shown in Figs. 18 and 20. This vibration is exerted on the plate alone for a length of time sufficient to provide a "forced spreading" of the buds B from the conical shape and size shown on Figs. 5, 5a and 19 to the wafer-thin form bottom G shown in Figs. 6, 6a and 20. The latter formed bottoms G are then spread out on the sheet material 33 to contact those adjacent, and are each of sufficient size to provide a completely sealing closure of a shell S.

When each of said filled molds and plates carrying the "forced spread" bottoms G passes off the vibrator V it reaches the end E of the conveyor 40 opposite end A. See Figs. 12 and 13. Here an operator may be stationed who dismounts the plate 31 with the spread bottoms G from the filled molds and reverses the same by turning said bottoms G to face the top side of said filled molds. At the same time the downwardly extending pins 32 are entered into the mold holes 30c for positively aligning the plate with said bottoms G with the filled shells S in the mold to assure positioning of said bottoms G for application as complete sealing closures.

As said filled mold continues to advance, it is slidingly moved off the conveyor end E onto a table top T which is located on the same level with the conveyor 40. The operator here may exert a downward pressure on the plate 31 before entirely removing the plate 31 thus leaving the sheet material 33 as a support for the bottoms G as shown in Figs. 7 and 7a.

There may be provided a second chain conveyor 50 similar in construction to conveyor 40 for continuing the improved method, said conveyor 50 may be continuously driven in the direction indicated by arrows in Fig. 12 by suitable power (not shown) in the well understood manner. Said conveyor 50 has its loading end F adjacent the conveyor end E and the Table T as shown in Figs. 12 and 13.

To complete the application of bottoms G for sealing the closures to the filled shells S, the operator loads said filled mold with the bottoms G and flexible material 31 applied thereto on the end F of the conveyor 50 which on advancing, passes under a pressure roller 51 as shown in Fig. 17. Here the flexible sheet 33 is flexed to permit successive portions of the bottoms G, to be pressed into position for making a positively sealed closure for said filled shells S, as shown partially completed in Fig. 17 and finished in Figs. 8 and 8a. The operation above described takes place while the contents of mold 30 is still in the preconditioned state and bottoms G sufficiently plastic so as to fuse with the shells S.

It is to be understood that the operator unloads each filled mold from the conveyor 40, lifts the plate 31 with the bottoms G from the filled mold, reverses said plate 31, applies the bottoms G in aligned position on the filled shells S carried in said mold 30, removes the plate 31, and finally loads the conveyor 50 to pass the filled mold under the pressure roller 51 all, in the manner described above, as successive movements of a continuous operation so that there is no break in the process.

The conveyor 50 is made long enough to allow time for the chocolate bottoms G and sealed closure joint to set, that is, to become substantially solid.

When each filled mold with the sealed shells S reaches the end H of the conveyor 50 opposite end F another operator slides the mold on a table top U which is positioned at the same level as the conveyor 50, removes the flexible sheet material 33 for inspecting the sealed closures. If for any reason any small imperfections are found the operator removes such imperfections. He then transfers the uncovered mold to the loading end L of a conveniently located transfer belt conveyor 51 which may be situated over conveyor 50, but run continuously in the opposite direction thereto as shown in Fig. 12. Any suitable power drive (not shown) may be provided for the conveyor 51, or conveyors 50 and 51 may be driven from the same power. On conveyor 51 the uncovered mold is given further time to cool so that the chocolate of the product P has a chance to become relatively hard. At the other end K of said conveyor 51 another operator unloads the molds and empties the completely finished product P, which is then ready for packing and shipping.

It has been found desirable to partition off various devices making up the apparatus herein above described so as to segregate those which operate best at a higher room temperature from those working best in relatively lower temperature surroundings. In Figs. 12 and 13, a wall W is shown to indicate that the devices to the left thereof are best operated at a higher room temperature in order to retain the preconditioning of the chocolate shells S and bottoms G and those devices to the right of said wall W are best operated at a lower room temperature to cause the hardening of the chocolate of said product P. The end E of the conveyor 40 passes through the wall W as shown in Figs. 12 and 13.

It will thus be seen that there is provided an apparatus and method in which the several objects of the invention are achieved and which is well adapted to meet the conditions of practical use.

As various other possible embodiments of the invention might be made of the above invention, and as various changes in the embodiment above set forth, it is to be understood that all matters herein set forth or shown in the accompanying drawings and described in the specification is to be interpreted as illustrative and not in a limiting sense.

Having thus described my invention, I claim as new and desire to secure by Letters Patent:

1. In a method for making confections, the steps of simultaneously spreading separate plastic closure deposits from smaller to larger size area coverings, and sealing shells by flexing said larger sized coverings by applying successive portions thereof to said shells.

2. In a method of the character described, the steps of depositing separated closure materials, "force spreading" each of said deposited materials to a predetermined size, and pressing successive portions of each of said sized materials onto a shell confection to serve as a closure.

3. In the method of making confections the steps of depositing plastic material sufficient to form a closure for an open end of a filled shell, thereafter enlarging the effective size of said deposited closure material, and applying by flexing the enlarged closure material to successive portions of said open end for sealing the shell.

4. In a method for making confections of the character described, the steps of depositing a plurality of closure products in plastic state on a horizontal plane surface preparatory to sealing openings in shells and vibrating said deposited products for "force spreading" the same to enlarge the effective area of said products to a size substantially equal to the area of the shell opening to be sealed before applying the enlarged closure products to seal the shell.

5. In a method of the character described the steps of moving partially manufactured confections under a shell closing material supply, depositing closure material in plastic state at a spaced distance over said confection for movement therewith, and enlarging the size of said deposited material sufficiently by "forced spreading" to serve as closures for each of the confections during said movement.

6. In a method of the character described the steps of moving partially manufactured confections under a shell closing material supply, depositing closure material in plastic state at a spaced distance over said confection for movement therewith, enlarging the size of said deposited material sufficiently by "forced spreading" to serve as closures for each of the confections during said movement, and applying said enlarged material to the confection for finishing the manufacture thereof.

HENRY E. BIANCHI.